(12) United States Patent
Siliqi

(10) Patent No.: US 9,457,331 B2
(45) Date of Patent: Oct. 4, 2016

(54) MARINE ACQUISITION USING SUBAQUATIC FLOATING SEISMIC NODES

(71) Applicant: CGGVERITAS SERVICES SA, Massy (FR)

(72) Inventor: Risto Siliqi, Paris (FR)

(73) Assignee: CGG SERVICES SA, Massy (FR)

(*) Notice: Subject to any disclaimer, the term of this patent is extended or adjusted under 35 U.S.C. 154(b) by 771 days.

(21) Appl. No.: 13/854,223

(22) Filed: Apr. 1, 2013

(65) Prior Publication Data

US 2013/0258806 A1    Oct. 3, 2013

Related U.S. Application Data

(60) Provisional application No. 61/619,007, filed on Apr. 2, 2012.

(51) Int. Cl.
*G01V 1/38* (2006.01)
*B01J 8/00* (2006.01)
*G01V 1/00* (2006.01)
(Continued)

(52) U.S. Cl.
CPC ............ *B01J 8/008* (2013.01); *B01J 8/025* (2013.01); *B01J 19/249* (2013.01); *B01J 19/2485* (2013.01); *B01J 19/305* (2013.01); *B01J 19/325* (2013.01); *G01V 1/003* (2013.01); *G01V 1/3808* (2013.01); *B01J 2208/00884* (2013.01); *B01J 2208/06* (2013.01); *B01J 2219/249* (2013.01); *B01J 2219/2443* (2013.01); *B01J 2219/2455* (2013.01); *B01J 2219/2459* (2013.01); *B01J 2219/2482* (2013.01); *B01J 2219/2485* (2013.01); *B01J 2219/2486* (2013.01); *B01J 2219/2487* (2013.01); *B01J 2219/2488* (2013.01); *B01J 2219/2496* (2013.01); *B01J 2219/3085* (2013.01); *B01J 2219/30475* (2013.01); *F28D 2021/0022* (2013.01);
(Continued)

(58) Field of Classification Search
CPC .... G01V 1/38; G01V 1/3808; G01V 1/3843; B63G 8/001; B63G 2008/002; B63G 2008/004
USPC .......................................................... 367/15
See application file for complete search history.

(56) References Cited

U.S. PATENT DOCUMENTS 5,894,450 A    4/1999  Schmidt et al.
6,474,254 B1 * 11/2002  Ambs et al. ................... 114/312
(Continued)

FOREIGN PATENT DOCUMENTS

EP    1217390 A1    6/2002

OTHER PUBLICATIONS

Neil M. Bogue, et al., "SOAR Range Validation Test: Autonomous Buoyancy-Driven Gliders, Autonomous Surface Vehicles, and Autonomous Profiling Floats", Office of Naval Research, Jan. 3-9, 2011, pp. 1-26.
(Continued)

*Primary Examiner* — Ian J Lobo
(74) *Attorney, Agent, or Firm* — Patent Portfolio Builders PLLC

(57) ABSTRACT

Methods and systems are presented for generating and performing a seismic data acquisition mission based on an a priori sea current model and a seismic data acquisition operation model and a shooting solution model based on the a priori sea current model. The individual models can be updated based on releasing sample buoys through the survey area both before and during mission execution.

18 Claims, 18 Drawing Sheets

(51) Int. Cl.
| | |
|---|---|
| B01J 19/24 | (2006.01) |
| B01J 19/30 | (2006.01) |
| B01J 19/32 | (2006.01) |
| B01J 8/02 | (2006.01) |
| F28F 3/08 | (2006.01) |
| F28F 9/007 | (2006.01) |
| F28F 13/06 | (2006.01) |
| F28D 21/00 | (2006.01) |

(52) U.S. Cl.
CPC ............. *F28F3/083* (2013.01); *F28F 9/0075* (2013.01); *F28F 13/06* (2013.01)

(56) References Cited

U.S. PATENT DOCUMENTS

| | | |
|---|---|---|
| 6,625,083 B2 | 9/2003 | Vandenbroucke |
| 6,932,185 B2 | 8/2005 | Bary et al. |
| 2010/0185348 A1* | 7/2010 | Webb .............................. 701/21 |
| 2010/0302901 A1 | 12/2010 | Welker et al. |
| 2012/0020185 A1* | 1/2012 | Welker et al. ................... 367/16 |
| 2012/0069702 A1* | 3/2012 | Muyzert et al. ................ 367/15 |

OTHER PUBLICATIONS

David S. Hammond, "Optimal Deployment of Drifting Acoustic Sensors", Advanced Avionics, Inc., Report, Sep. 30, 2007, pp. 1-10, XP055086303, Internet: URL:http://www.dtic.mil/dtic/tr/fulltext/u2/a573166.pdf.

S.M. Jesus, et al., "AOB—Acoustic Oceanographic Buoy: Concept and Feasibility", Proceedings of Underwater Defense Technology UDT'2006, Jan. 1, 2006, pp. 1-7, XP055086306, Hamburg.

International Search Report mailed Nov. 7, 2013, in related International Application No. PCT/EP2013/056827.

Written Opinion mailed Nov. 7, 2013, in related International Application No. PCT/EP2013/056827.

* cited by examiner

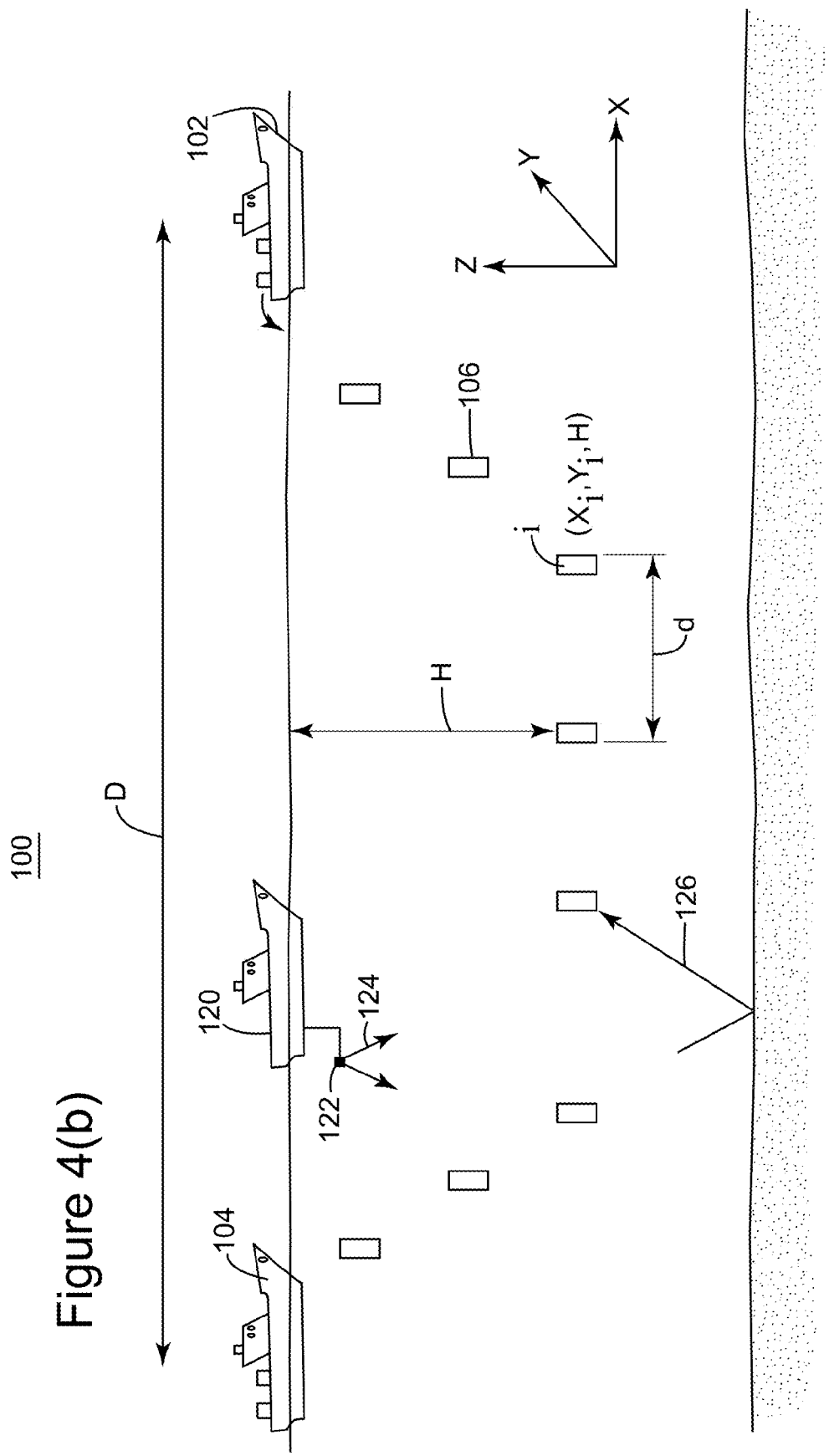

MARINE ACQUISITION USING SUBAQUATIC FLOATING SEISMIC NODES

CROSS-REFERENCE TO RELATED APPLICATIONS

The present application is related to and claims the benefit of priority of U.S. Provisional Application Ser. No. 61/619,007, entitled "Marine Acquisition Using Subaquatic Floating Seismic Nodes," filed on Apr. 2, 2012 to Risto Siliqi, the entire contents of which is incorporated herein by reference.

TECHNICAL FIELD

Embodiments of the subject matter disclosed herein generally relate to methods and systems and, more particularly, to mechanisms and techniques for performing a marine seismic survey using buoys that carry appropriate seismic sensors.

BACKGROUND

Marine seismic data acquisition and processing generates a profile (image) of geophysical structures under the seafloor. While this profile does not directly provide a precise location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration for determining properties of the subsurface of the earth, which is especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional system for generating the seismic waves and recording their reflections from the geological structures present in the subsurface is illustrated in FIG. 1. A vessel 10 tows an array of seismic receivers 11 provided on streamers 12. The streamers may be disposed horizontally, i.e., lying at a constant depth relative to the surface 14 of the ocean or may have other configurations. The streamers may be disposed to have other than horizontal spatial arrangements. The vessel 10 also tows a seismic source array 16 configured to generate a seismic wave 18. The seismic wave 18 propagates downward toward the seafloor 20 and penetrates the seafloor until eventually a reflecting structure 22 (reflector) reflects the seismic wave. The reflected seismic wave 24 propagates upward until it is detected by the receiver 11 on the streamer 12. Based on the data collected by the receiver 11, an image of the subsurface is generated by further analyses of the collected data.

However, this traditional configuration is expensive because of the high costs associated with operating the towing vessel and the streamers. In addition, the data produced by the receivers of the streamers can be negatively impacted due to the flow noise produced by the movement of the streamers in the surrounding water. Further, the notch diversity of the data recorded with the streamers can be limited. To overcome some of these problems, new technologies deploy seismic sensors on the bottom of the ocean (ocean bottom stations, OBS) to achieve a coupling with the ocean bottom and to reduce the noise. Even so, positioning the seismic sensors remains a challenge for OBS technology.

Other technologies use permanent receivers set on the sea bottom, as disclosed in U.S. Pat. No. 6,932,185 (herein '185), the entire content of which is incorporated herein by reference. In this case, the seismic sensors 60 are attached, as shown in FIG. 2 (which corresponds to FIG. 4 of the '185), to a heavy pedestal 62. A station 64 that includes the sensors 60 is launched from a vessel and arrives, due to its gravity, at a desired position. The station 64 remains on the bottom of the ocean permanently. Seismic data recorded by sensors 60 is transferred through a cable 66 to a mobile station 68. When necessary, the mobile station 68 may be brought to the surface to retrieve the seismic data.

Although this method provides a good coupling between the ocean bottom and the seismic receivers, the process is still expensive and not flexible because the stations and corresponding sensors are difficult to move around or reuse. Further, positioning the stations is not straightforward. Furthermore, the notch diversity is not greatly improved.

An improvement to this method is described, for example, in European Patent No. EP 1 217 390 (herein '390), the entire content of which is incorporated herein by reference. In this document, a receiver 70 is removably attached to a pedestal 72 together with a memory device 74 as illustrated in FIG. 3. After recording the seismic signals, the receiver 70 and the memory device 74 are instructed by a vessel 76 to detach from the pedestal 72 and to surface at the ocean surface 78 to be picked up by the vessel 76.

However, this configuration is not very reliable because the mechanism maintaining the receiver 70 connected to the pedestal 72 may fail to release the receiver 70. Also, the receiver 70 and pedestal 72 may not reach their intended positions on the seabed. Further, the fact that the pedestals 72 are left behind increases ocean pollution and the survey price, which is undesirable.

Thus, it can be seen from the above approaches that a characteristic of the existing methods is to record seismic signals either (i) close to the surface, with streamers, or (ii) at the seabed with OBS. Neither situation offers the desired notch diversity.

Accordingly, it would be desirable to provide systems and methods that provide an inexpensive and reliable device for recording seismic signals with good notch diversity.

SUMMARY

A method of generating and performing a seismic data acquisition mission using a plurality of free-floating subaquatic nodes comprising generating an a priori model of sea currents, in a survey area, from available atmospheric and oceanographic data; generating a seismic data acquisition operation model based on said a priori model of sea currents; generating a seismic shooting solution to provide illumination and fold of subsurface targets associated with said survey area; launching, from a vessel, a sample portion of said plurality of free-floating subaquatic nodes for collecting preliminary position data associated with said sample portion of said plurality of free-floating subaquatic nodes as they traverse said survey area to confirm sea current drift predicted by said a priori model and refining said seismic data acquisition operation model based on said preliminary position data; launching the remainder of said plurality of free-floating subaquatic nodes based on said a priori model and said seismic data acquisition operation model; firing said seismic shooting solution based on said seismic data acquisition operation model; and recovering said plurality of free-floating subaquatic nodes, individually, as each free-floating subaquatic node exits said survey area.

A system for performing a marine-based seismic data acquisition comprising a plurality of free-floating subaquatic nodes; one or more vessels for deploying and retrieving said plurality of free-floating subaquatic nodes; a sea current model component for generating an a priori model, based on atmospheric and oceanographic data, of sea currents associated with a survey area; a operation model component for generating a seismic data acquisition operation model based on said a priori model; a shooting model component for generating a shooting solution model based on said seismic data acquisition operation model; and an update component for analyzing position data collected from said plurality of free-floating subaquatic nodes and updating said seismic data acquisition operation model and said shooting solution model.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 4a and 4b are schematic diagrams of a seismic survey system that uses buoys for recording seismic data according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a buoy having seismic sensors and being deployed from a deployment vessel. However, the embodiments to be discussed next are not limited to buoys being deployed from a vessel, but may be applied to other devices that may include seismic sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
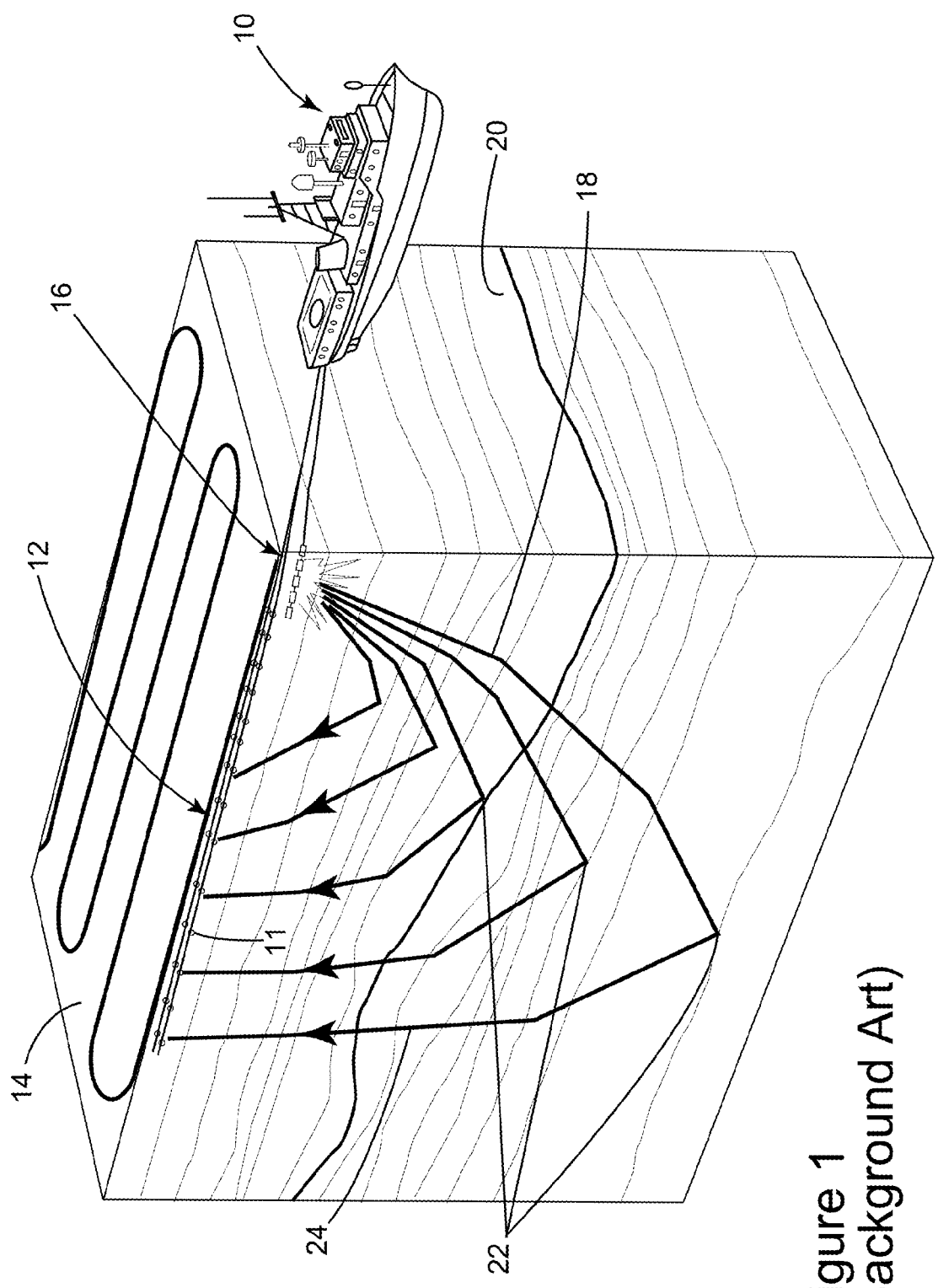
FIG. 1 is a schematic diagram of a background art seismic survey system.
Figure 2:
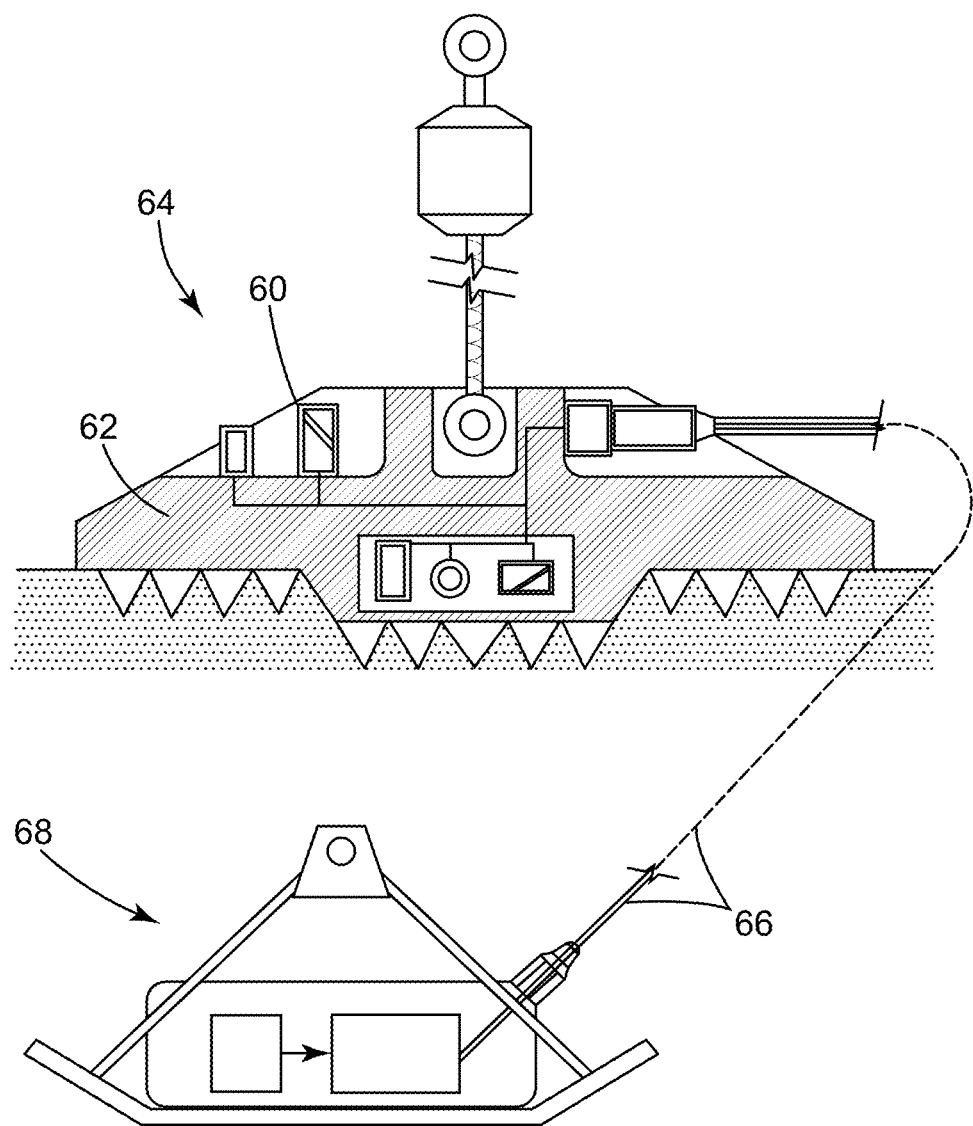
FIG. 2 is a schematic diagram of a background art station that may be positioned on the bottom of the ocean for seismic data recording.
Figure 3:
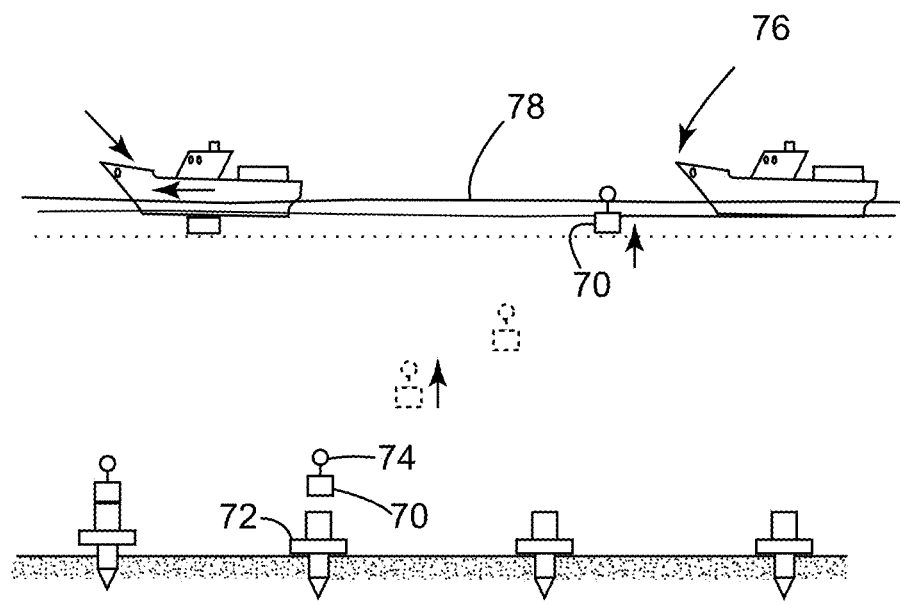
FIG. 3 is a schematic diagram of another background art station that may be positioned on the bottom of the ocean for seismic data recording.
Figure 4A:
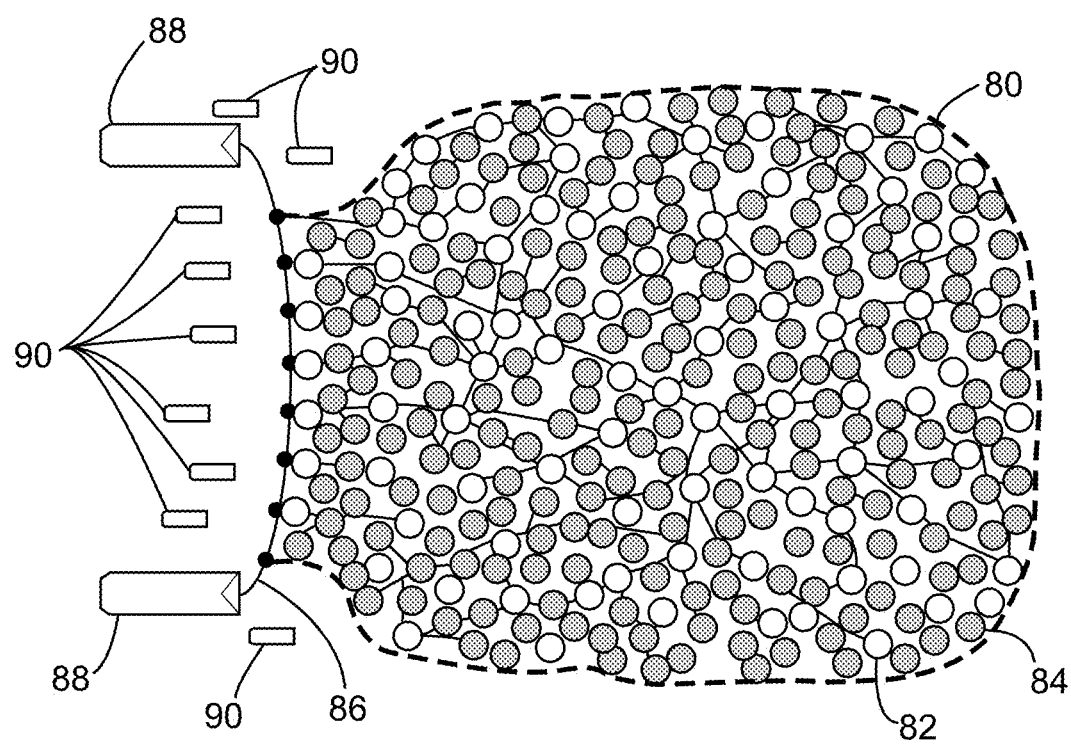

Looking to FIG. 4a, an initial exemplary embodiment shows a top view of a net 80 enclosing a collection of floating receiver buoys 82 and spacer buoys 84. The net 80 is connected to a tow line 86 that is connected to one or more vessels 88. The exemplary embodiment further includes sources 90 for creating the seismic sounding wave.

It should be noted in the exemplary embodiment that the spread can be static during the seismic acquisition and seen as a net of floating nodes while the sources move to different positions. After an exemplary embodiment acquisition is completed, the net can be towed to a different position and another acquisition cycle can be completed. This process can be repeated until the area of interest has been sampled.

New technologies in marine seismic surveys need an inexpensive system for deploying and recovering the sea-based seismic receivers. According to an exemplary embodiment, such a seismic system includes multiple buoys, each having one or more seismic sensors. The buoys are initially stored on a launching vessel. The launching vessel launches the buoys at predetermined distances along a course of the vessel. The seismic receivers may be at least one of a hydrophone, geophone, accelerometer, electromagnetic sensor, etc. The buoys are configured to control their own buoyancy so that each buoy is capable of reaching a predetermined depth and then resurfacing on its own, when instructed. After performing the recording, according to an exemplary embodiment, a recovery vessel approaches the buoys, instructs them to resurface and collects them. It should be noted in the exemplary embodiment that a buoy is also known as a free-floating subaquatic node.

However, there are certain areas where the underwater currents are strong and, thus, the buoys are not stationary during the seismic survey. For this situation, the new technology takes advantage of the existing underwater currents and allows the buoys to travel underwater to follow the current path. For this reason, the current paths (or trajectories) may be estimated before launching the buoys so it is known where to expect the buoys to arrive after a given time for collection purposes. The launching and recovery vessels may track the position of the buoys and update the current paths based on real-time measurements. The seismic receivers of the buoys are configured to record seismic signals as a buoy travels from the launching vessel to the recovery vessel. The seismic signals are time-stamped and associated with corresponding three-dimensional (3D) positions (coordinates of the buoy) where the signals were recorded.

A seismic system assumed to operate underwater with low or no water currents is now discussed in more detail according to an exemplary embodiment illustrated in FIG. 4b. FIG. 4b illustrates a seismic survey system 100 that may include a launching vessel 102, a recovery vessel 104 and plural buoys 106. Both vessels 102 and 104 may act as (i) recovery or (ii) launching or (iii) recovery and launching vessels. These vessels may be small boats with a low cost of operation.

The launching vessel initially stores the plural buoys 106. When the survey is started, the launching vessel 102 launches the buoys 106 with a certain space interval d. The space interval d may be, for example, between 10 and 200 m. However, the value of the space interval may vary according to the goals of the seismic survey. The system 100 may also include one or more source vessels 120 that are configured to tow a seismic source 122. The seismic source 122 is configured to generate a seismic wave 124. A reflected seismic wave 126 is recorded by the seismic receiver of the buoy 106.

The buoys 106 are configured to sink to a predetermined depth H and then to maintain that depth until instructed to the contrary. The depth may, for example, be between 200 and 300 m. However, other depths may be used according to the goals of the seismic survey.

The launching vessel launches the buoys while moving along a predetermined path. The buoys, assuming that there is low or no underwater current, tend to maintain their absolute position. Seismic sources are deployed to generate seismic waves. Reflections of the seismic waves from the subsea surfaces are recorded by the seismic receivers of the buoys. While recording the seismic waves, the buoys also listen for an acoustic signal from the recovery vessel that indicates that the buoy needs to resurface. Upon receiving that acoustic signal, the buoy resurfaces and it is then collected by the recovery vessel.

Figure 5:
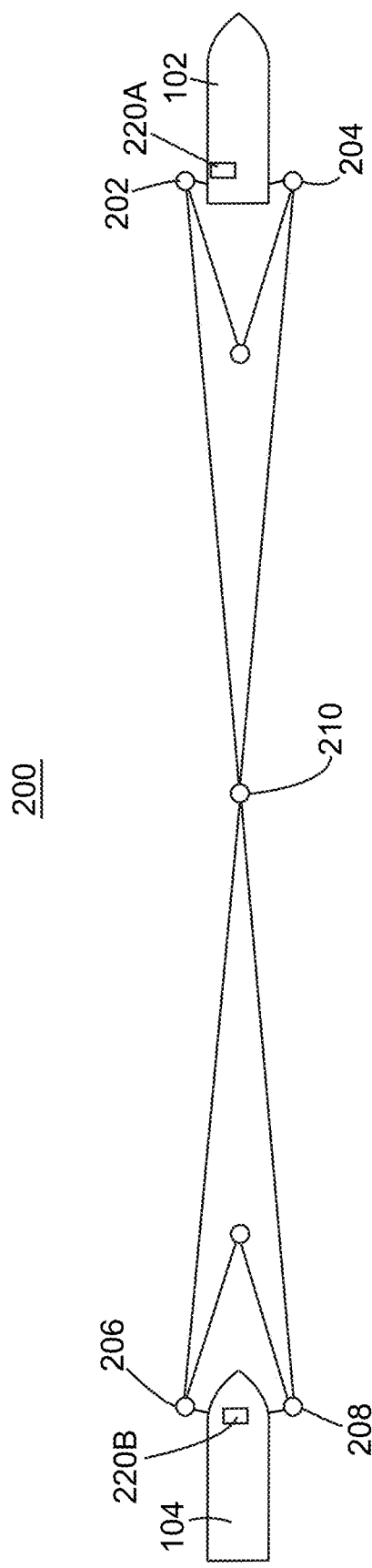
FIG. 5 is a schematic diagram of two vessels that determine an underwater position of a buoy according to an exemplary embodiment.

A distance D between the launching and recovery vessels may be in the order of kilometers, for example, 10 km. Under this scenario, as illustrated in FIG. 5, the launching vessel 102 may have two acoustic pingers 202 and 204 (that form an acoustic system) and the recovery vessel 104 may have two acoustic pingers 206 and 208. The acoustic pingers may be provided on sides of the vessels and may be configured to use their own frequencies (f1 to f4) so that a buoy 210 receives four different frequencies from the acoustic pingers. The acoustic pingers may be configured to transmit a signal, for example, every 5 seconds, with a range of 5 km.

The buoy may have an oscillator (to be discussed later) that keeps a copy of the 5-second transmitting clock. Thus, the buoy is configured to record the time of arrival of the acoustic signals from the pingers. Combining that information with the depth information given by its pressure gauge and the positions of the pingers (provided, for example, by a differential global positioning system (DGPS), and optionally by the pitch and roll of the boats), it is possible to reconstitute the absolute position of each buoy at any desired time so that the time-stamped recorded signals may be mapped to the positions of the buoy when the seismic signals were recorded. FIG. 5 shows DGPS units 220A and 220B mounted on each vessel. Other GPS-type units may be used.

Thus, the buoys shown in FIGS. 4b and 5 may be imagined as the equivalent of one or more streamers (in terms of seismic data collection), but with the advantage that there is no drag on the vessels, a depth range of the buoys is much enlarged comparative with a real streamer, and a distance d between the receivers may be adjusted as desired.

Figure 6:
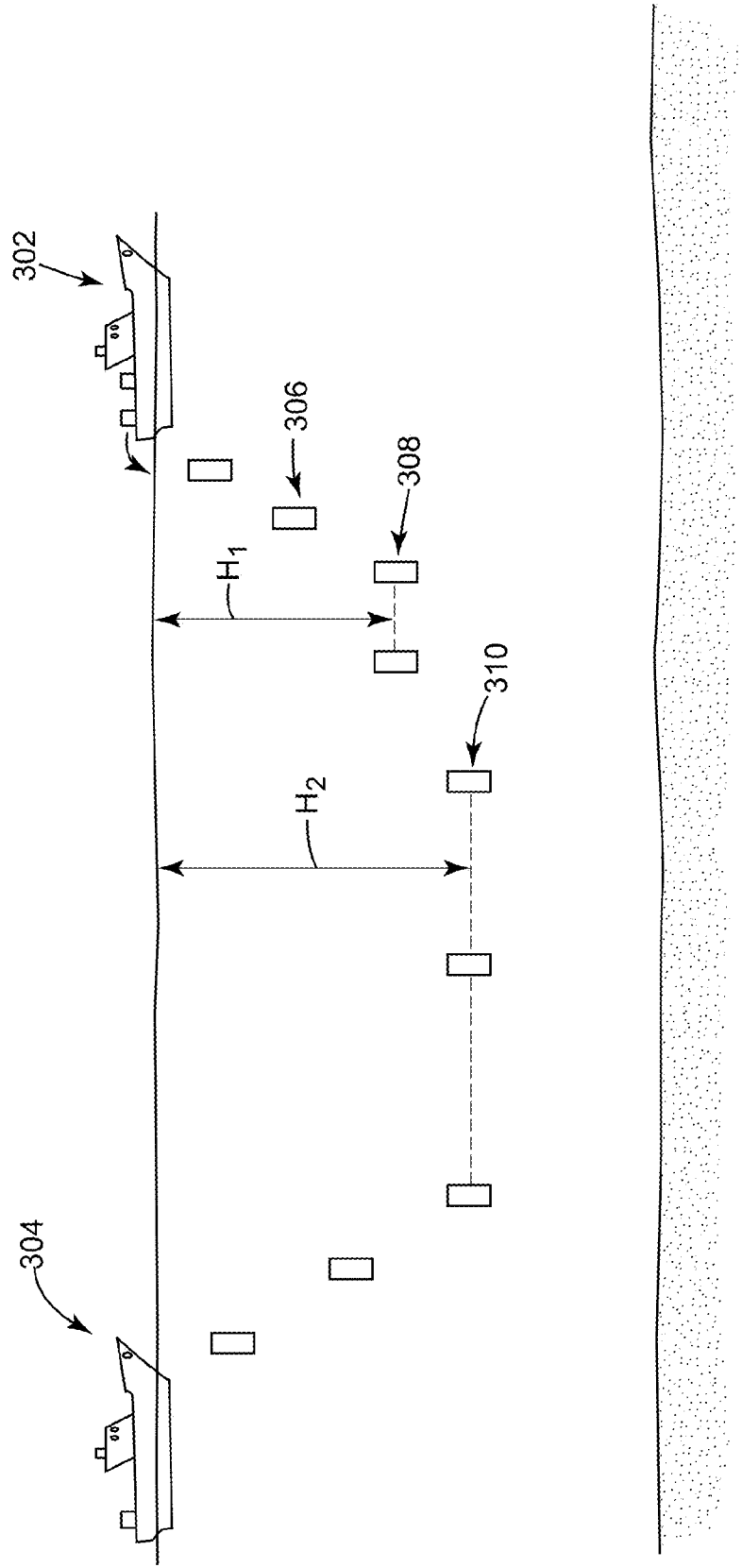
FIG. 6 is a schematic diagram of a seismic survey system that uses plural buoys distributed at various depths for recording seismic data according to an exemplary embodiment.
Figure 7:
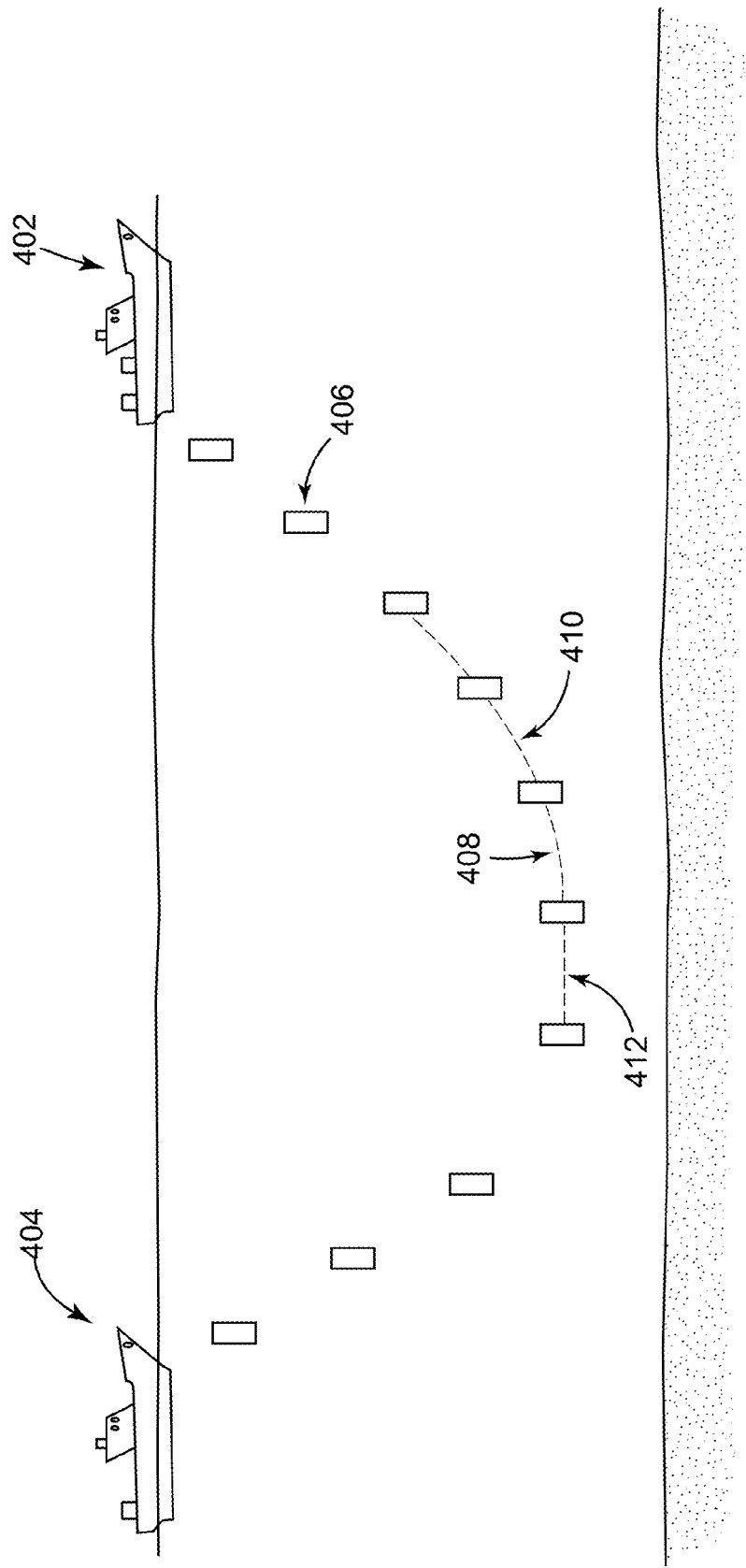
FIG. 7 is a schematic diagram of a seismic survey system that uses plural buoys distributed along a curve for recording seismic data according to an exemplary embodiment.

Also, the buoys may be instructed before being launched from the launching vessel 204 to have various depths as illustrated in FIGS. 6 and 7.

In this respect, FIG. 6 is a side view showing a system 300 that includes a launching vessel 302, a recovery vessel 304 and plural buoys 306. Some buoys form a first layer 308, which is provided at a first depth H1, and other buoys form a second layer 310, which is provided at a second depth H2, different from H1. Although FIG. 6 shows the buoys provided at only two depths, those skilled in the art would appreciate that the buoys may be provided at more than two depths.

FIG. 7 is a side view showing a system 400 that includes a launching vessel 402, a recovery vessel 404, and plural buoys 406. The buoys are arranged in this embodiment along a curve 408. The curve 408 may be a straight line, a parabola, a hyperbola, an exponential, etc., or a combination of these types of functions. In the embodiment illustrated in FIG. 7, the curve 408 has a curved portion 410 and a straight line portion 412. It is noted that the buoys not distributed on the curve 408 are travelling to either reach their final underwater position (those closer to the launching vessel 402) or their surface position (those closer to the recovery vessel 404) for being recovered by the recovery vessel 404.

Figure 8:
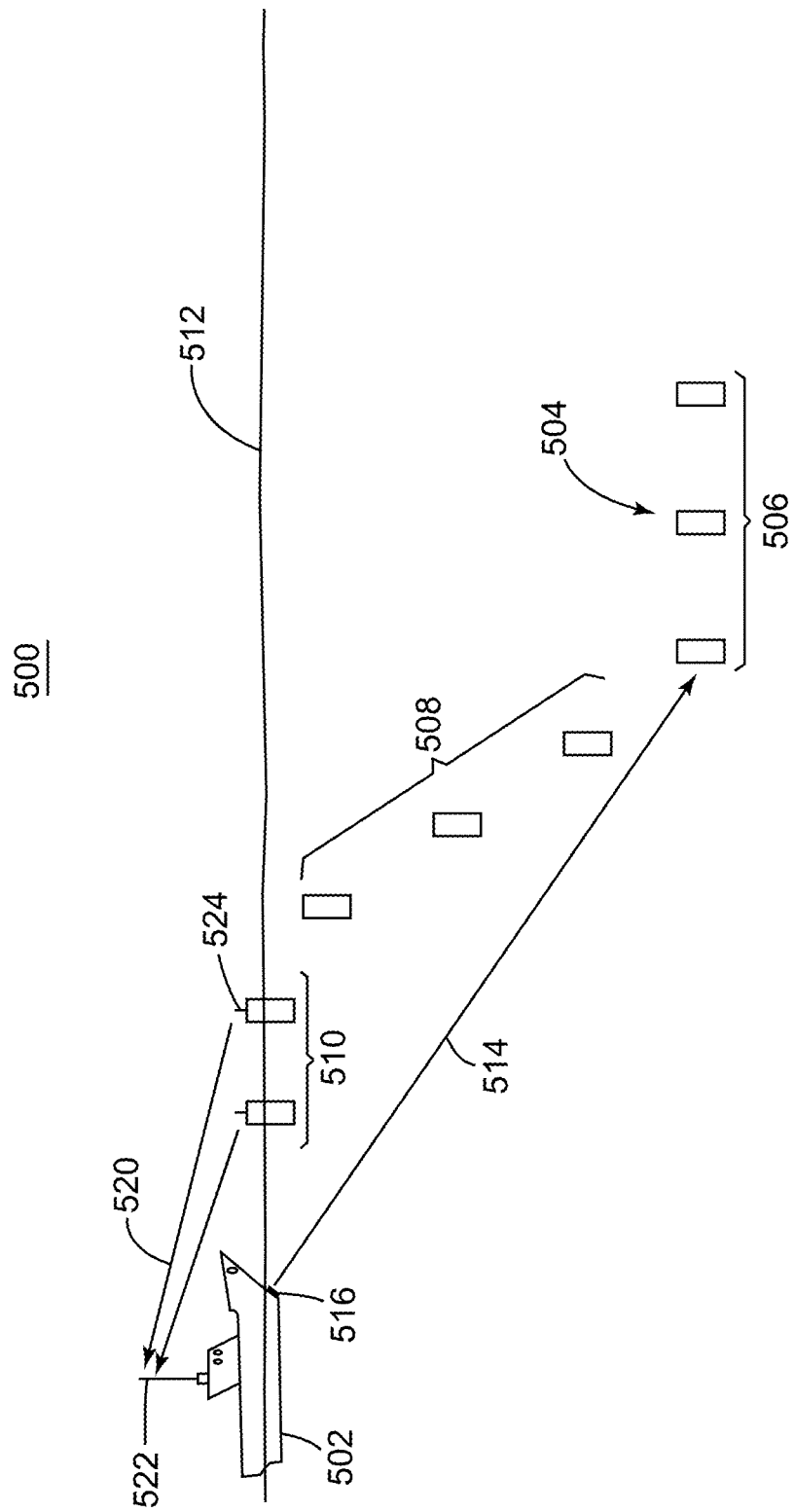
FIG. 8 is a schematic diagram of a recovery vessel that instructs various buoys to resurface for recovery according to an exemplary embodiment.

The recovery phase of the buoys is now discussed with regard to FIG. 8. FIG. 8 shows a system 500 that includes a launching vessel (not shown), a recovery vessel 502 and plural buoys 504. A set of buoys 506 is shown having a predetermined depth, while another set of buoys 508 are in the process of surfacing, and still another set of buoys 510 are already at the water surface 512 waiting to be recovered by the recovery vessel 502.

The recovery vessel generates an acoustic signal 514 with an appropriate acoustic signal generator 516. The acoustic signal 514 may have a frequency f5 different from the frequencies used by the pingers of the launching and recovery vessels. The acoustic signal 514 may be a short-range acoustic signal and constitutes a command for the buoy to surface. When a buoy receives the acoustic signal 514, the buoy activates its buoyancy system (to be discussed later) to resurface. The set of buoys 508 are in the middle of the resurfacing process. Once at the water surface, each buoy of the set of buoys 510 activates a radio-frequency (RF) beacon (transmitter) for sending a signal 520 to the RF goniometer 522 of the recovery vessel 502. Thus, each buoy may have an RF transmitter 524.

Based on this information, the recovery vessel 502 determines the position of each buoy and recovers them. The recovery process may include bringing the buoys on a deck of the vessel. The structure of a buoy is now discussed with regard to FIG. 9.

Figure 9A:
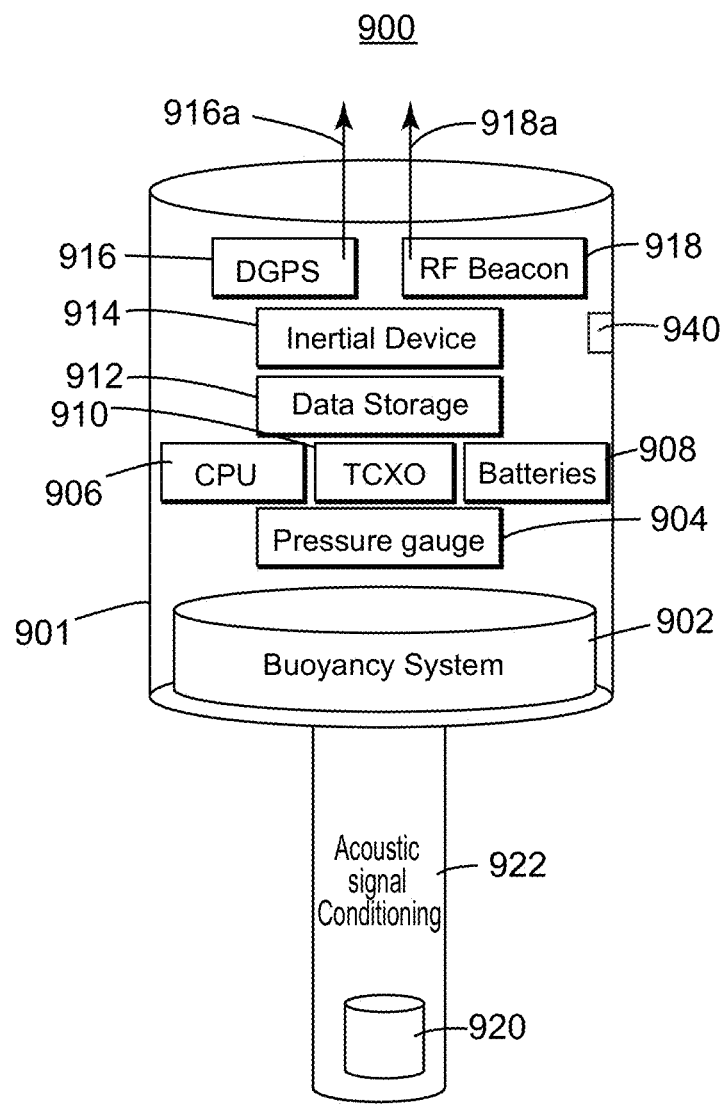
FIGS. 9a and 9b are schematic diagrams of a buoy configured to record seismic signals while traveling underwater according to an exemplary embodiment.

FIG. 9a illustrates an exemplary buoy 900. The buoy 900 may have a body 901 that includes a buoyancy system 902 configured to control the buoyancy of the buoy. For example, the buoyancy system 902 may change the effective density of the buoy. The density of any object is determined by its mass divided by its volume. The buoy 900 may keep its mass constant, but altering its volume changes its density. To achieve this, for example, a hydraulic piston may be used to push, e.g., mineral oil out of the buoy and expand a rubber bladder at the bottom end of the buoy. As the bladder expands, the buoy becomes less dense than the seawater and rises to the surface. Upon being launched from the launching vessel, the buoy withdraws the piston and descends to the desired depth to record seismic signals.

This is one example for controlling the buoyancy of the buoy. Those skilled in the art would appreciate that other systems may be employed for controlling the buoyancy of the buoy. In one application, the buoyancy system may include a motor and a propeller to further control the speed and direction of the buoy.

Further, the buoy 900 may include one or more sensors 904, e.g., a pressure gauge, for determining the pressure and/or temperature of the ambient of the buoy, etc. A processor 906 may be connected to the sensors 904 and the buoyancy system 902 for coordinating the up and down movement of the buoy. The processor 906 may also be configured to control the vertical speed of the buoy by controlling the buoyancy of the buoy. For example, the processor may be configured to achieve a first speed for a shallow depth and a second speed for higher depths. Also, the processor 906 may calculate the depth of the buoy based on the pressure readings from the sensor 904.

The processor 906 may also be connected to a battery 908, a high-accuracy oscillator or clock module 910, e.g., a temperature-controlled crystal oscillator (TCXO), a data storage device 912, an inertial device 914, a GPS 916 and a corresponding antenna 916a, and an RF beacon 918 and a corresponding antenna 918a, etc. The battery 908 may be any known battery. The module 910 is configured to provide an accurate time to the processor 906 for correctly time-stamping the recorded seismic data. In one application, the module 910 is configured to sample every 2 ms the acoustic signal and time-stamp it. The module 910 may also record a compass direction. Based on the temperature sensor, the module 910 may adjust/correct its oscillating time to provide an accurate time as the water temperature is changing.

The optional inertial device 914 may be an inexpensive inertial navigation system (INS). An inertial navigation system includes at least a module containing accelerometers, gyroscopes or other motion-sensing devices. The INS is initially provided with the position and velocity of the buoy from another source, for example, a human operator, the GPS 916, etc., and thereafter the INS may compute its own updated position and velocity by integrating information received from its motion sensors. The advantage of an INS is that it requires no external references in order to determine its position, orientation or velocity once it has been initialized. Further, usage of the INS is inexpensive. However, in the exemplary embodiment discussed herein, the position of the buoy is determined using the pingers of the vessels discussed above.

The buoy 900 may also include the RF beacon 918, which is configured to send RF signals such that a vessel can locate the buoy. The processor 906 is configured to activate the RF beacon 918 when the buoy is at the surface of the water, or the antenna 918a is capable of transmitting the RF signals to a vessel. Those skilled in the art would recognize that the buoy may include other equipment that helps the navigation. However, it is desirable to provide an inexpensive buoy and, for this reason, it may be desirable that the equipment added to the buoy be kept to a minimum.

In terms of seismic equipment, the buoy 900 may include one or more seismic sensors 920. Such a sensor may be at least one of a hydrophone, geophone, accelerometer, electromagnetic sensor, etc. In one application, the seismic sensor includes only a hydrophone. In another application, the seismic sensor includes a hydrophone and three geophones. Once the buoy has reached the desired depth, the buoy stabilizes its position by performing, for example, a control loop between the buoyancy control system and the pressure gauge. Additionally, the buoy 900 may include an acoustic signal conditioning module 922. This module is configured to process the acquired seismic signals, for example, to apply various filters to the recorded seismic signals.

Figure 9B:
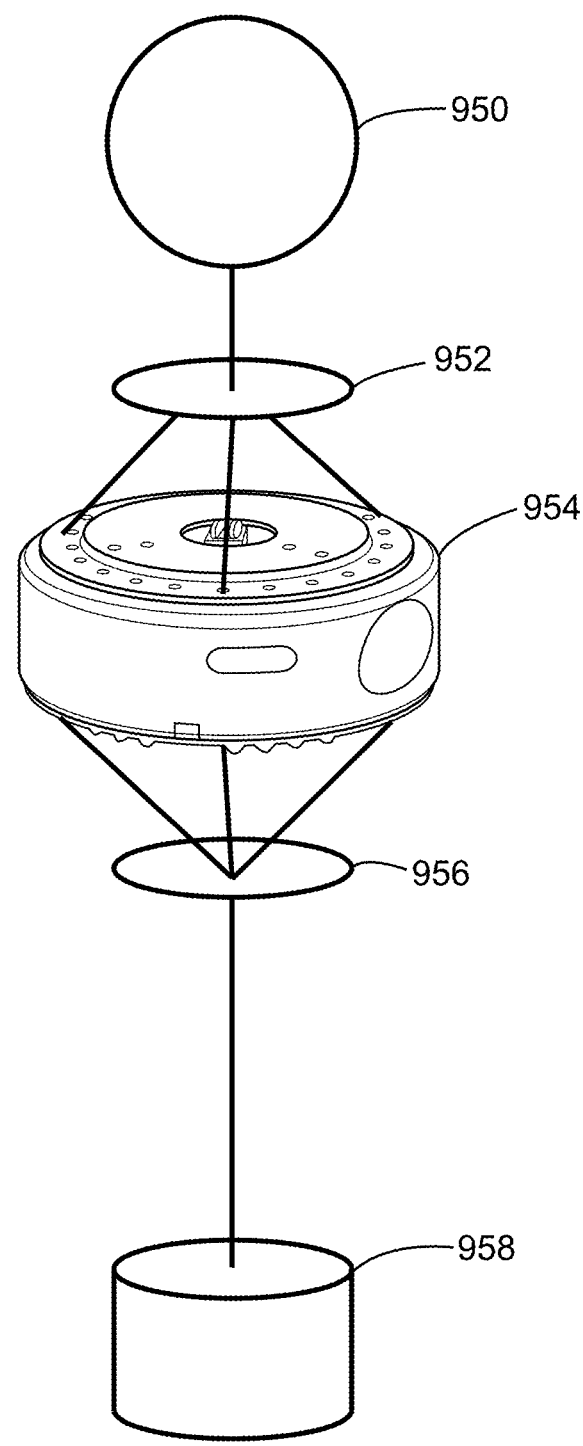

Looking to FIG. 9b, another exemplary buoy is illustrated. The exemplary buoy comprises a float 950, a top stabilizer 952, an underwater buoy 954, a bottom stabilizer 956 and an anchor 958. It should be noted in the exemplary embodiment that the float 950 and the anchor 958 are not necessarily attached to anything above or below the exemplary buoy, allowing the buoy to drift with the current while maintaining a stable orientation at a configured depth.

Figure 10:
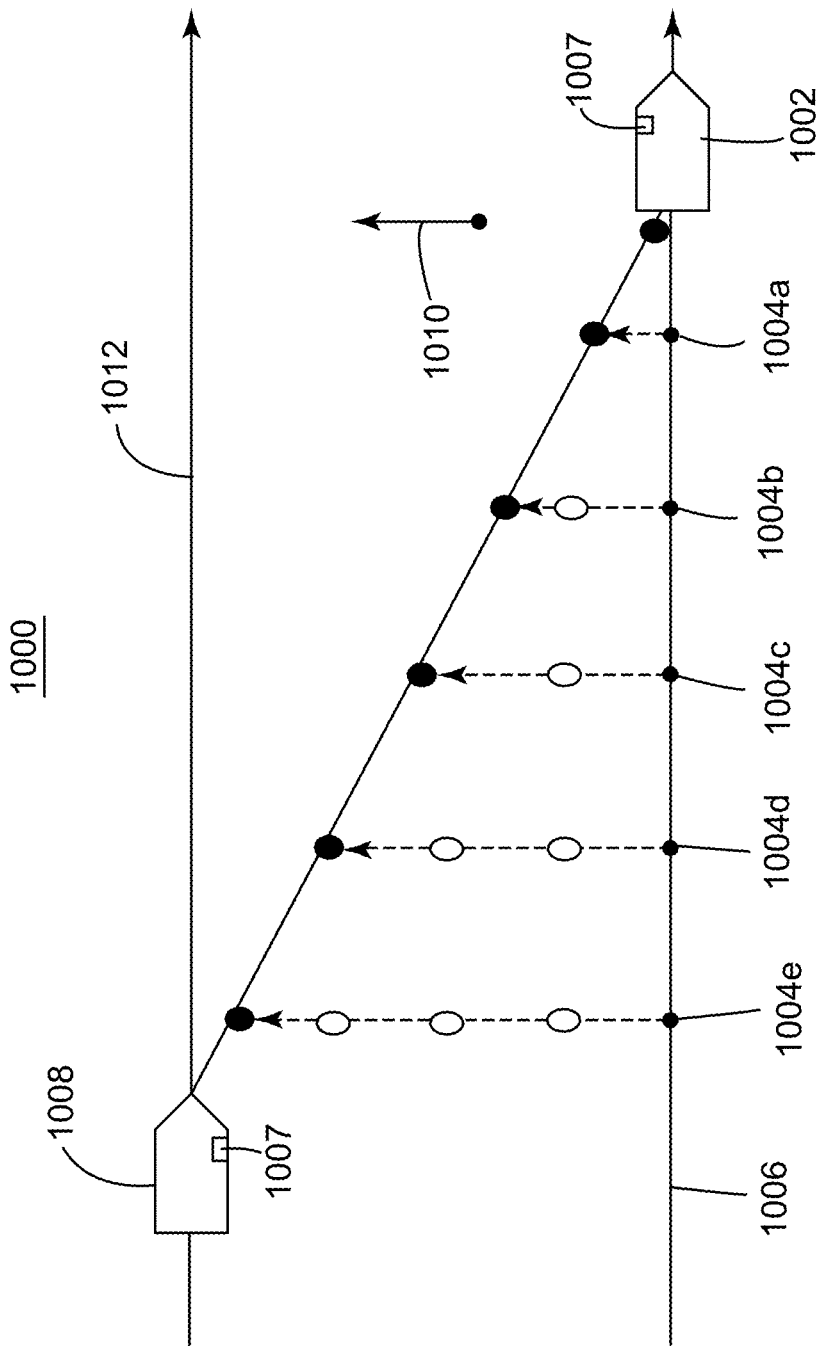
FIG. 10 is a schematic diagram of a seismic survey system configured to take into consideration lateral currents when recovering buoys according to an exemplary embodiment.

The embodiments discussed above have assumed that the water currents are minimal or non-existing. However, if there are some underwater currents (not strong currents) that need to be taken into account, the next exemplary embodiments explain how to address this matter. FIG. 10 shows a top view of a system 1000 in which the launching vessel 1002 launches buoys 1004a-e along a predetermined path 1006. A real-time map of the buoys may be achieved by using the pingers of the vessels. Thus, a controller 1007 provided on the recovery vessel 1008, or on the launching vessel 1002, or distributed on both vessels, may calculate how strong the underwater currents 1010 are and may instruct the recovery vessel 1008 to take a path 1012 to correctly intercept the resurfacing buoys.

Figure 11:
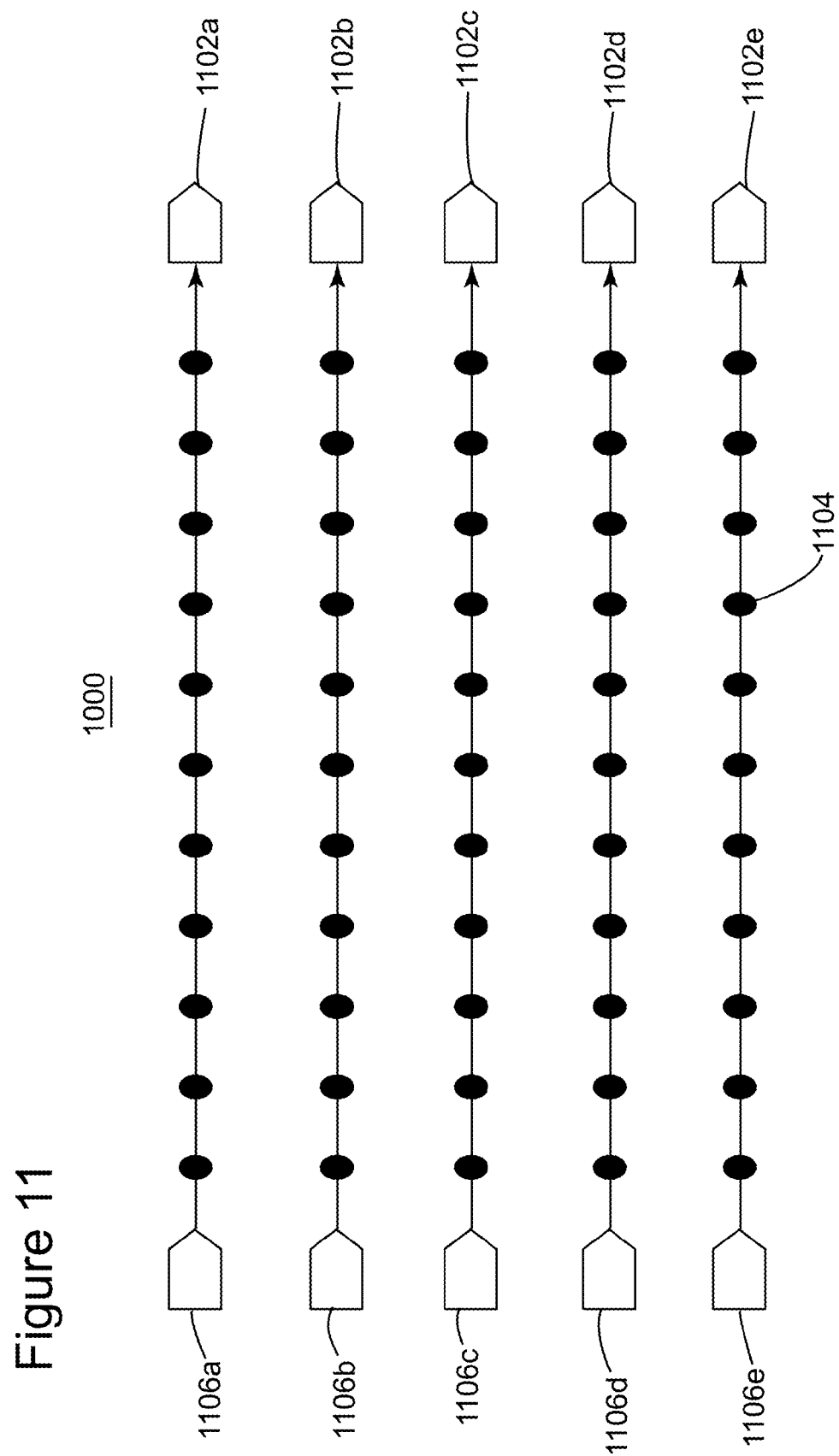
FIG. 11 is a schematic diagram of a seismic survey system that includes plural launching vessels and plural recovery vessels according to an exemplary embodiment.

The buoys may also be used to perform a 3D seismic survey as shown in FIG. 11. The system 1100 may include plural launching vessels 1102a-e and corresponding plural recovery vessels 1106a-e. Buoys 1104 are launched by each launching vessel and recovered by the corresponding recovery vessel as explained in the previous embodiments. Source vessels may be used to obtain a wide azimuth seismic survey. Thus, such a system may work similarly to a conventional system in which a vessel tows multiple streamers. In this case, a "streamer" is formed by the buoys between the launching vessel and the recovery vessel.

However, the system shown in FIG. 11 is cheaper than the conventional streamer system because the vessels used to launch and recover the buoys are not as sophisticated as the vessel that tows the streamers, there is no drag produced by the buoys on the vessel, and the buoys themselves are cheaper than the streamers. In addition, the present system obtains more diversified data, the seismic receivers on the buoys reach a greater depth than the current depths achieved by the streamers, and the flow noise is minimized or entirely suppressed because the speed of the buoy during data acquisition is substantially zero.

In addition, because the flow noise present in the case of the real streamers is absent in the present design, the speed of the launching and recovery vessels may be increased above the conventional 5 knots per hour used in streamer-based seismic surveys. This decreases the time necessary for completing the survey, which results in a reduced cost for renting and operating the equipment, and also reduces personnel expenses. Further, the present system may be deployed near obstructed areas, e.g., next to drilling platforms, etc. Not the least, the data recorded with the present system achieves the highest notch diversity, which is desirable for data deghosting.

However, if the underwater currents are significant, for example, having a speed equal to or greater than 200 or 300 meters per hour (m/h), the above-discussed embodiments pose a challenge to the recovery vessel when recovering the buoys because the buoys may spread beyond a desired range. Thus, according to another exemplary embodiment, the high underwater currents may be used to the advantage of the seismic survey as now discussed.

Figure 12:
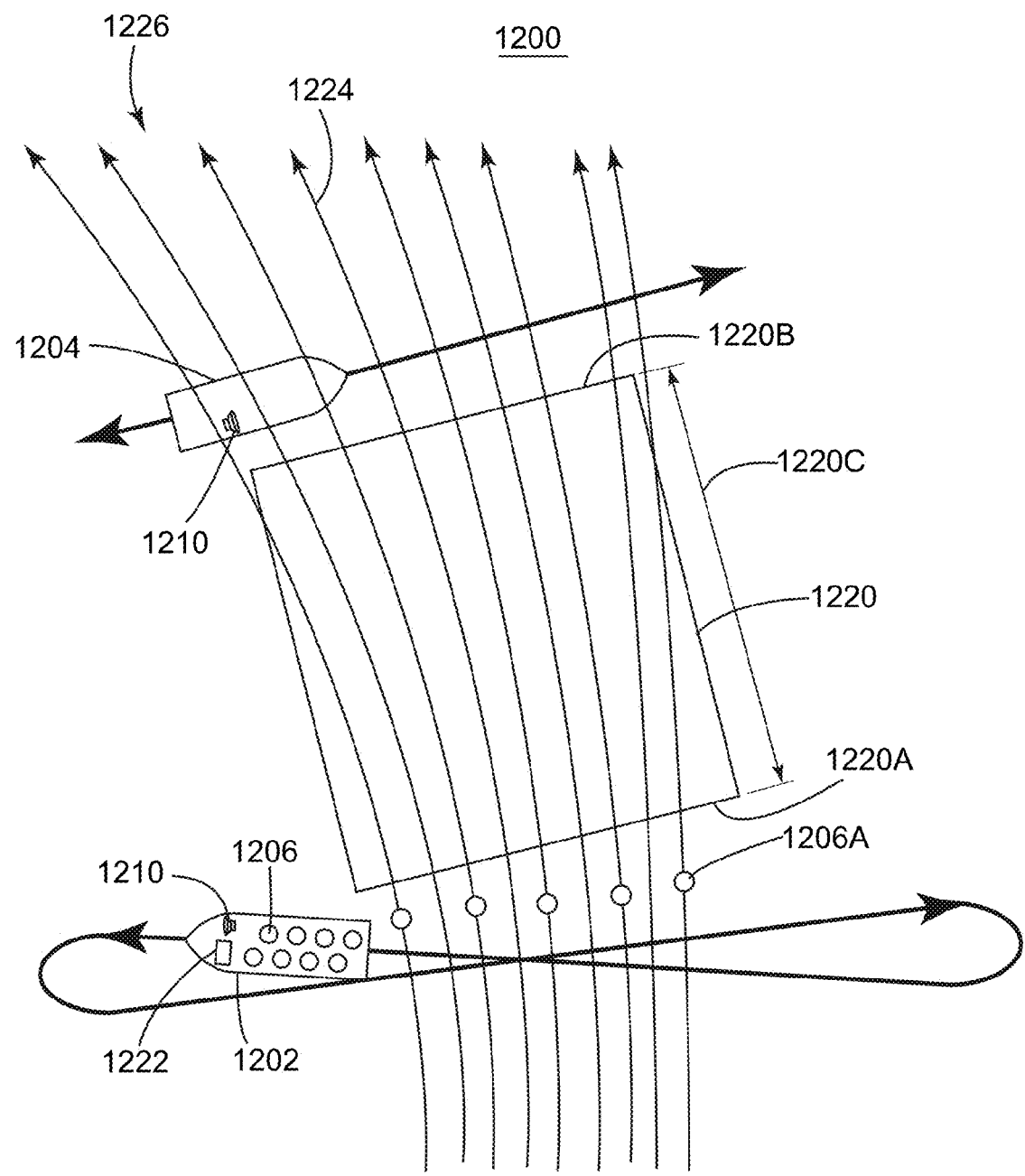
FIGS. 12-15 are schematic diagrams of another seismic survey system according to an exemplary embodiment.

As illustrated in FIG. 12, a system 1200 includes a launching vessel 1202, a recovery vessel 1204, and plural buoys 1206. The vessels may be equipped with an acoustic system 1210 for tracking the position of the buoys when underwater. An exemplary acoustic system is described next, and this system can track the buoy with an accuracy of approximately five meters at a distance on the order of kilometers.

The acoustic system 1210 may be an Ultra-short baseline (USBL) system, also sometimes known as Super Short Base Line (SSBL). This system uses a method of underwater acoustic positioning. A complete USBL system includes a transceiver, which is mounted on a pole under a vessel, and a transponder/responder on the buoy. A processor is used to calculate a position from the ranges and bearings measured by the transceiver. For example, an acoustic pulse is transmitted by the transceiver and detected by the subsea transponder, which replies with its own acoustic pulse. This return pulse is detected by the transceiver on the vessel. The time from the transmission of the initial acoustic pulse until the reply is detected is measured by the USBL system and is converted into a range. To calculate a subsea position, the USBL calculates both a range and an angle from the transceiver to the subsea buoy. Angles are measured by the transceiver, which contains an array of transducers. The transceiver head normally contains three or more transducers separated by a baseline of, e.g., 10 cm or less.

FIG. 12 also shows a seismic survey area 1220 that is desired to be surveyed with the buoys 1206. Based on various data (e.g., historic data) available for the underwater currents corresponding to the area 1220, a current model is developed through computer calculations in a computer system 1222. The output of these computer calculations is a number of current paths/trajectories 1224. Thus, a current map 1226 may be developed for the area 1220 of interest. With this information, the survey is designed so that the buoys are launched at a side (line) 1220A of the area 1220 of interest such that the underwater current 1224 would take the buoys to the opposite side (line) 1220B of the area 1220. Thus, a course/trajectory of the launching and/or recovery vessels may be substantially perpendicular on the trajectories of the underwater currents.

A distance 1220C travelled by the buoys may be in the order of kilometers, e.g., 20 to 30 km. In other words, the buoys are expected in this embodiment to travel along the current 1224, from one side 1220A of the survey area 1220 to an opposite side 1220B of the survey area 1220.

Figure 13:
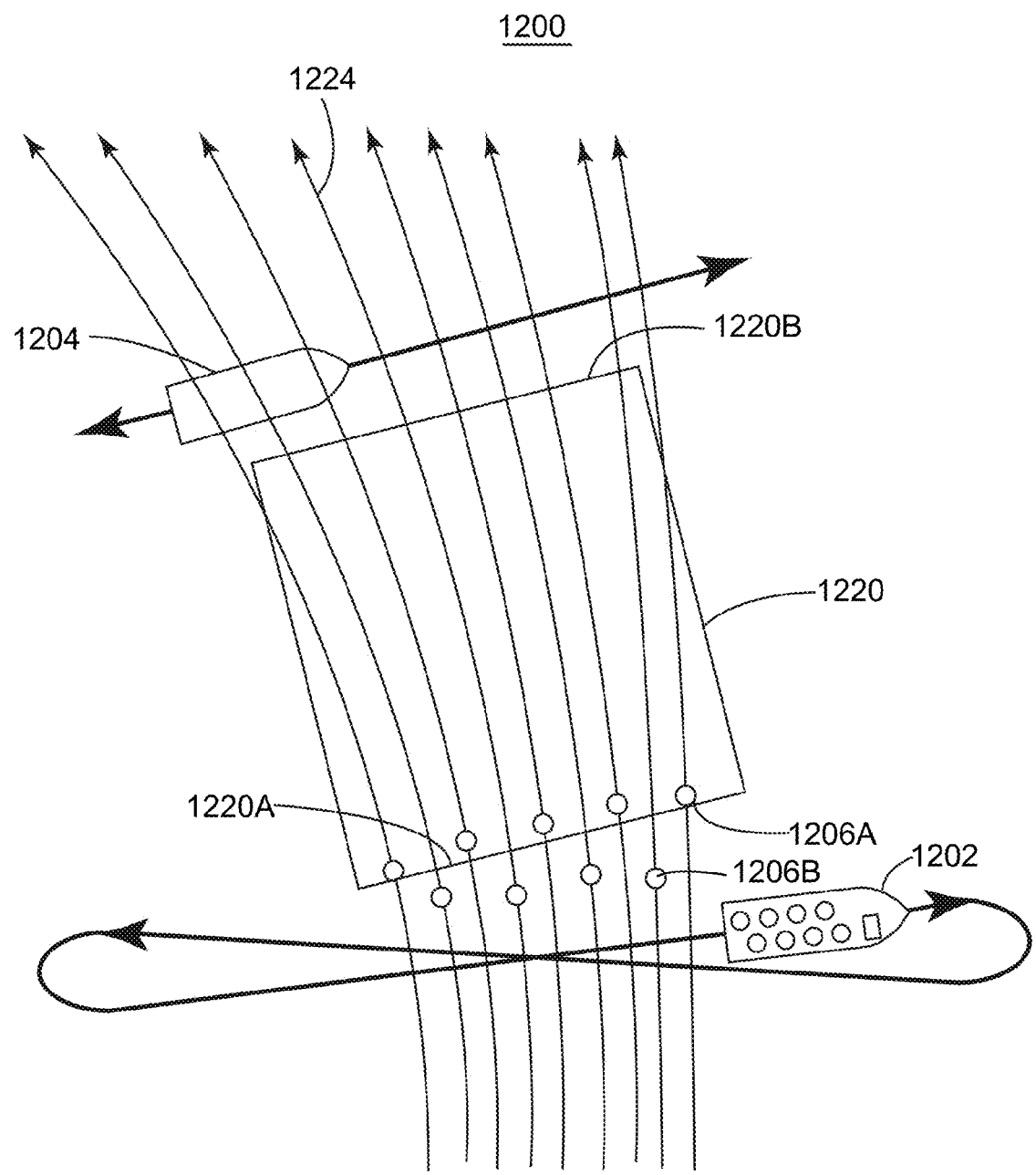
Figure 14:
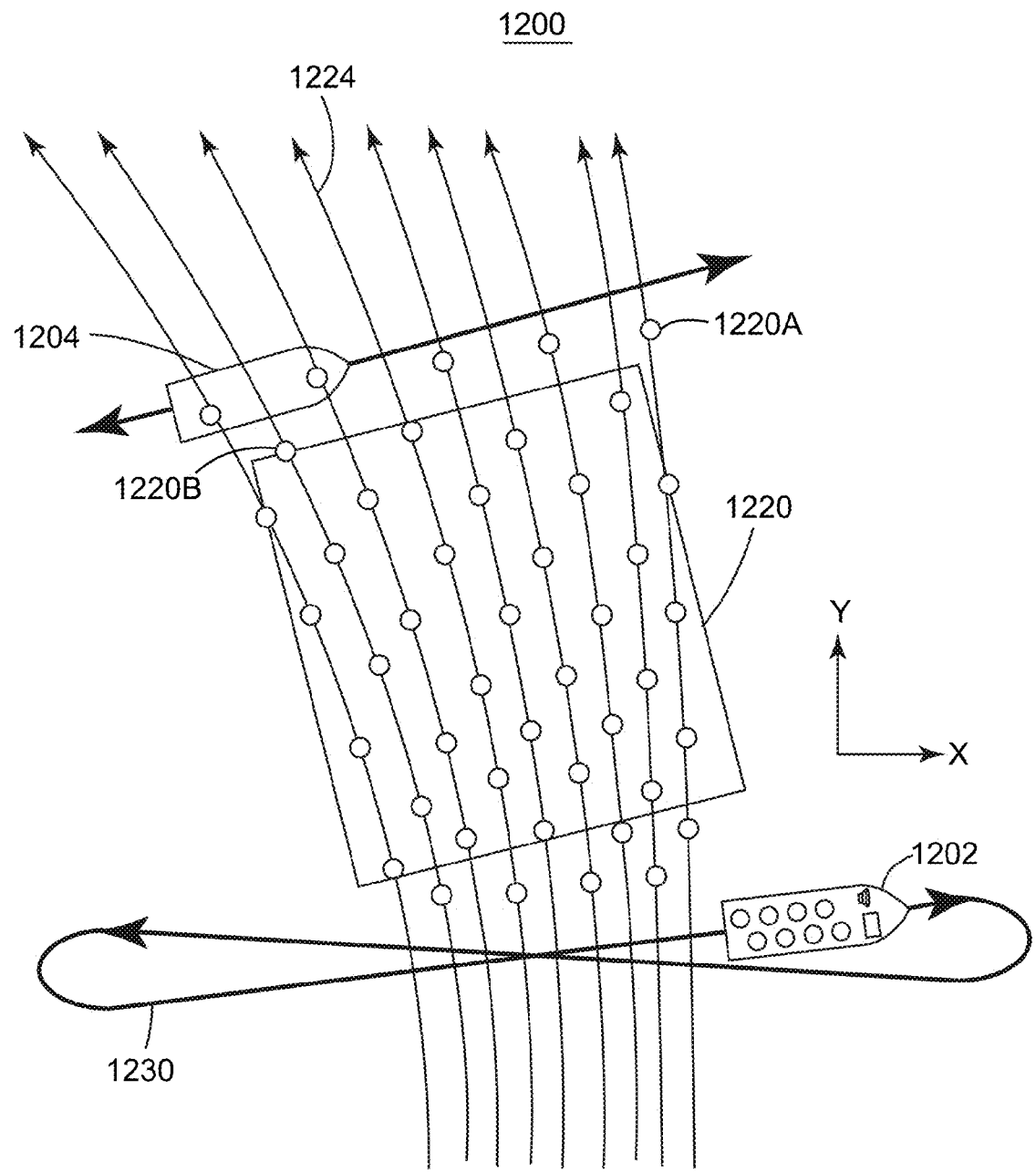

Thus, for such an arrangement, the launching vessel is instructed to travel back and forth along the first side 1220A and to launch a first set of buoys 1206A at a first pass, a second set of buoys 1206B at a second pass (later in time) as shown in FIG. 13, and so on until a desired number of buoys has been launched as shown in FIG. 14. It is noted in these figures the path 1230 followed by the launching vessel and how the buoys are spaced along an X direction at a desired first distance and along a Y direction at a desired second distance. FIG. 14 also shows how the first set of buoys 1220A reach the recovery vessel 1204. It is noted that the buoys 1220 are distributed underwater similar to the embodiment shown in FIG. 4, with the exception that in that embodiment the buoys are almost stationary, while in FIGS. 12-14 the buoys travel underwater, up to tens of kilometers as required by the survey. For example, for a current of 700 m/h as might be in the Gulf of Mexico, a buoy may travel along the current 1224 for 84 km in five days.

Figure 15:
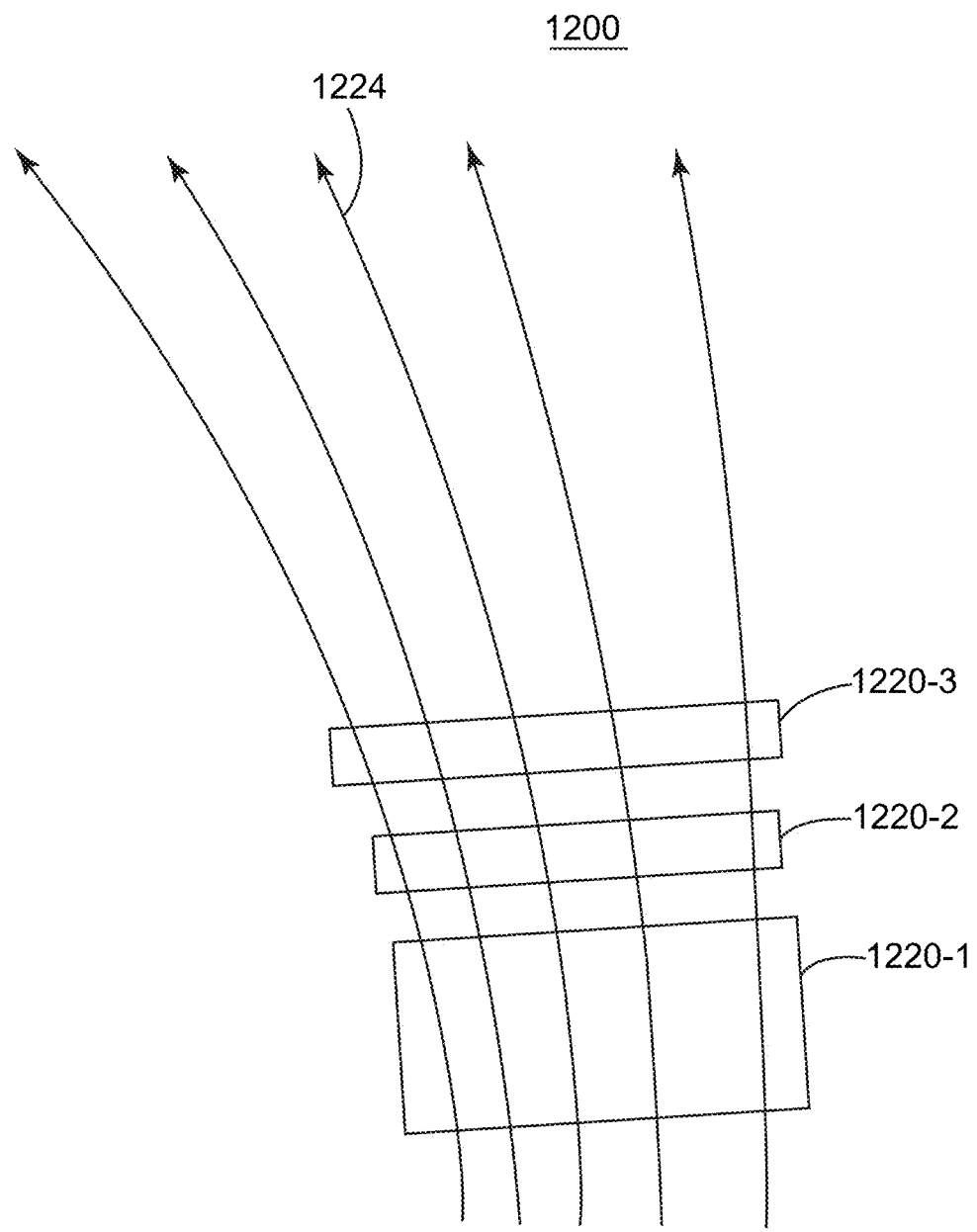

If there is a desire to limit the spread of the buoys over the X axis, the survey may be divided into smaller areas (rectangles or other shapes) 1220-1 to 1220-3 as shown in FIG. 15, and each smaller area may be surveyed as shown in FIGS. 12-14. Once the survey of one area is finalized, the recovery vessel may become the launching vessel and the former launching vessel moves to the end of the second area to restart the recovery for the survey.

Continuing with an exemplary embodiment, pre-study and planning of a survey mission, accomplished with a sea current model component, is based on an a priori model of the currents in the survey area. It should be noted in the exemplary embodiment that the information and measurements used for the initial model are available from sources such as but not limited to Argos, weather forecasts, national government administrations, etc. It should further be noted in the exemplary embodiment that this phase of the planning can include the launching of a sample number of buoys at sea in the area of interest to validate obtained data, collect data in areas where data is not obtainable or refine data based on changing conditions. The exemplary embodiment initial model can be iterative updated as new data becomes available. Further in the exemplary embodiment, data can be collected from the sample buoys while they are drifting at sea and the model can be re-computed and updated in quasi real-time or with delays associated with data transmission time.

Next in the exemplary embodiment, a complete seismic acquisition plan and operational model is prepared by an operation model component using the previously defined a priori model of the currents associated with the survey area of interest. The exemplary embodiment seismic acquisition plan will provide an initial deployment plan of the course of the buoys as they drift with the currents through the survey area of interest. Further in the exemplary embodiment, the seismic shooting scenario is defined by a shooting model component to guarantee the expected illumination and fold of the subsurface targets. Similar to the a priori model described above, the exemplary embodiment operational model is refined in situ before starting operations. In the exemplary embodiment operational model refinement, sample buoys can again be launched in the area of interest to verify that the exhibited buoy drift path is consistent with the operational model current predictions. If the sample buoys indicated a divergence from the exemplary embodiment operational model prediction greater than a predetermined error amount then the operational model is updated before beginning operations.

Further, in the exemplary embodiment, launching and positioning based on the operational model is implemented. The exemplary embodiment subaquatic seismic nodes can be launched from either a flying vessel, e.g. a helicopter, or a navigation vessel. It should be noted in the exemplary embodiment that the launch of the buoys is based on the operation model developed for the currents and the mission planning results. It should further be noted in the exemplary embodiment that seismic buoys can be launched individually or in clusters. It should be noted in the exemplary embodiment that an update component handles processing the real-time data collected from the buoys for modifying the generated operation model, shooting solution and the initial a priori model.

Positioning of the buoys in the exemplary embodiment can be based on techniques such as but not limited to 1) using the USBL of the vessels involved in the survey to track the buoys through a TDMA protocol capable of dealing with the large number of buoys; and 2) having two families of seismic buoys, i.e., master buoys and slave buoys, wherein the master buoys will communicate with the slave buoys to determine their position before firing each seismic shot. Further in the exemplary embodiment, the positions of the buoys are calculated in real-time using surface located radio frequency (RF) buoys. It should be noted in the exemplary embodiment that after the buoys are launched, the school of buoys drift freely following the currents associated with the survey area of interest but the general theoretical behavior of the school of buoys is known and anticipated based on the operational model. It should further be noted that the operational model and the deployment characteristics are updated in real-time based on data received from the buoys already deployed.

The patch geometry of the exemplary embodiment seismic buoys is not controllable after the buoys have been dropped into the sea and will change based on the current experienced by the individual buoy and the capability of the recovery ship to collect the buoys once they have exited the limits of the survey area but the drop timing and location of succeeding buoys can change based on data received from previously dropped buoys or other data inputs. Further in the exemplary embodiment, the navigation of the shooting vessels associated with this data acquisition survey are guided according to the ongoing operational model and mission plan and can be adjusted in real-time as information is received from deployed buoys or other data inputs.

In one aspect of the exemplary embodiment, buoys automatically return to the surface based on a dedicated resurfacing acoustic signal when they exit the predetermined survey area. A variety of techniques are available for recover the surfaced buoys, i.e., a large net or a catamaran type vessel with a recover device attached between the twin hulls. In both cases, acoustic devices are located on the recovery system to send the surface command to the buoys. In another aspect of the exemplary embodiment, the buoys upload their data to a collection device on the recovery vessel and are re-conditioned for re-deployment on the next sweep of another grid of the survey area. It should be noted in the exemplary embodiment that the positioning characteristics of the buoys can be updated/changed before the buoys are redeployed, based on data received from the buoys or mission changes.

Figure 16:
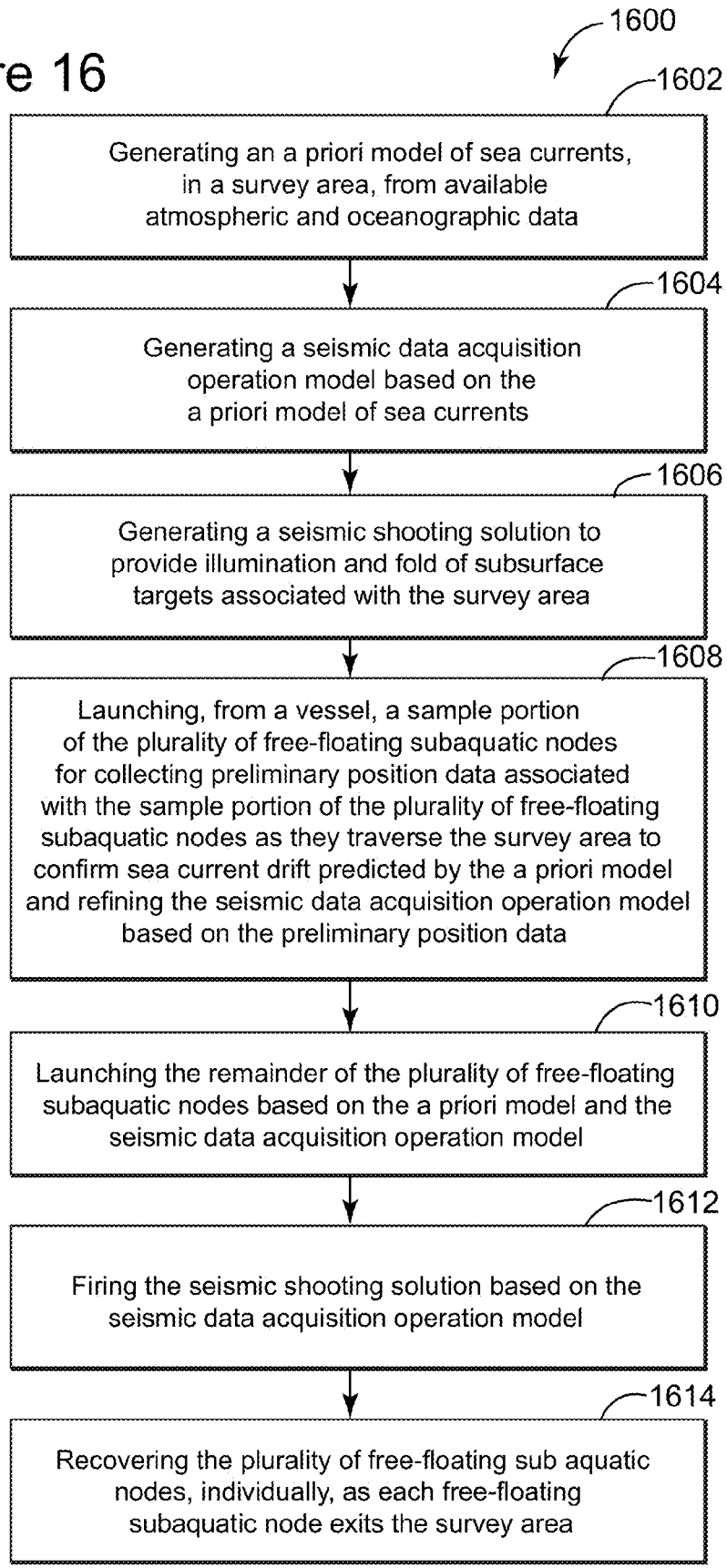
FIG. 16 is a flowchart of a method for generating and performing a seismic data acquisition mission using a plurality of free-floating subaquatic nodes according to an exemplary embodiment.

The above-discussed embodiments may be implemented as methods as now discussed. According to an exemplary method embodiment 1600 illustrated in FIG. 16, there is a method for generating and performing a seismic data acquisition mission using a plurality of free-floating subaquatic nodes. The method includes a step 1602 of generating an a priori model of sea currents, in a survey area, from available atmospheric and oceanographic data; a step 1604 of generating a seismic data acquisition operation model based on the a priori model of sea currents; a step 1606 of generating a seismic shooting solution to provide illumination and fold of subsurface targets associated with the survey area; a step 1608 of launching, from a vessel, a sample portion of the plurality of free-floating subaquatic nodes for collecting preliminary position data associated with the sample portion of the plurality of free-floating subaquatic nodes as they traverse the survey area to confirm sea current drift predicted by the a priori model and refining the seismic data acquisition operation model based on the preliminary position data; a step 1610 of launching the remainder of the plurality of free-floating subaquatic nodes based on the a priori model and the seismic data acquisition operation model; a step 1612 of firing the seismic shooting solution based on the seismic data acquisition operation model; and a step 1614 of recovering the plurality of free-floating subaquatic nodes, individually, as each free-floating subaquatic node exits the survey area.

Note that, as used herein, the phrase "seismic shooting solution" is intended to include any of a variety of marine acquisition approaches including, but not limited to, so-called compressive sensing. For embodiments wherein a compressive sensing acquisition approach is used, the seismic shooting solution will then operate with the needed irregularity to preserve the sparseness of subsurface targets associated with the survey area.

The systems and processes discussed above are just some examples for illustrating the novel concepts of generating and performing a seismic data acquisition mission based on free-floating subaquatic nodes. Those skilled in the art would appreciate that these systems and/or processes may be changed, adjusted or modified to fit various needs.

One or more of the exemplary embodiments discussed above disclose a buoy configured to perform seismic recordings. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method of generating and performing a seismic data acquisition mission using a plurality of nodes, said method comprising:

generating an a priori model of sea currents, in a survey area, from available atmospheric and oceanographic data;

generating a seismic data acquisition operation model, based on said a priori model of sea currents, for the plurality of nodes;

generating a seismic shooting solution for seismic sources to provide illumination and fold of subsurface targets associated with said survey area;

launching, from a vessel, a sample portion of said plurality of nodes for collecting preliminary position data associated with said sample portion of said plurality of nodes as they traverse said survey area to confirm sea current drift predicted by said a priori model and refining said seismic data acquisition operation model for the plurality of nodes based on said preliminary position data;

launching the remainder of said plurality of nodes based on said a priori model and said refined seismic data acquisition operation model;

firing said seismic shooting solution based on said refined seismic data acquisition operation model;

recording seismic data with seismic sensors located on the plurality of nodes; and recovering said plurality of nodes.

2. The method of claim 1, wherein said generating an a priori model further comprises launching a portion of said plurality of nodes and collecting position data to confirm current predictions associated with said a priori model.

3. The method of claim 2, wherein said a priori model is updated based on said position data.

4. The method of claim 1, wherein said available atmospheric and oceanographic data comprises satellite based environmental monitoring data, local and regional weather forecast data and national government administration provided data.

5. The method of claim 1, wherein said vessel is an airborne vessel.

6. The method of claim 1, wherein said vessel is a seaborne vessel.

7. The method of claim 1, wherein said plurality of nodes are launched in clusters.

8. The method of claim 1, wherein said plurality of nodes are launched individually.

9. The method of claim 1, wherein said plurality of nodes comprise radio frequency (RF) surface nodes, master nodes and slave nodes and said master nodes collect position data from said slave nodes, said RF surface nodes collect said position data from said master nodes and said vessel collects said position data from said RF surface nodes.

10. The method of claim 1, wherein said vessel collects position data from said plurality of nodes.

11. The method of claim 1, wherein said launching the remainder of nodes further comprises collecting operational launch position data as nodes are launched and updating said seismic data acquisition operation model in real-time as said launching continues.

12. The method of claim 11, wherein said shooting solution is updated based on said launch position data.

13. A system for performing a marine-based seismic data acquisition, said system comprising:

a plurality of nodes;

one or more vessels for deploying and retrieving said plurality of nodes;

a sea current model component for generating an a priori model, based on atmospheric and oceanographic data, of sea currents associated with a survey area;

an operation model component for generating a seismic data acquisition operation model, based on said a priori model, for the plurality of nodes;

a shooting model component for generating a shooting solution model for seismic sources, based on said seismic data acquisition operation model; and an update component for analyzing position data collected from said plurality of nodes and updating said seismic data acquisition operation model for the plurality of nodes and said shooting solution model, wherein seismic sensors located on the plurality of nodes record seismic data generated as a consequence of applying the shooting solution model to the seismic sources.

14. The system of claim 13, wherein said atmospheric and oceanographic data further comprises satellite based environmental monitoring data, local and regional weather forecast data and national government administration provided data.

15. The system of claim 13, wherein said update component analyzes position data from previously launched nodes and updates said seismic data acquisition operation model for subsequently launched nodes.

16. The system of claim 13, wherein said plurality of nodes further comprise master nodes and slave nodes, wherein said master nodes collect position data from said slave nodes.

17. The system of claim 16, wherein radio frequency (RF) floating nodes collect said position data from said master node and said one or more vessels collect said position data from said RF floating nodes.

18. The system of claim 13, wherein said one or more vessels collect position data from said plurality of nodes.

* * * * *